(12) United States Patent
Newkirk

(10) Patent No.: US 12,704,367 B2
(45) Date of Patent: Aug. 11, 2026

(54) MICROMETER WITH PRESSURE SENSOR

(71) Applicant: Robert Bosch GmbH, Stuttgart (DE)

(72) Inventor: Daniel Newkirk, Owatonna, MN (US)

(73) Assignee: Bosch Automotive Service Solutions Inc., Warren, MI (US)

(*) Notice: Subject to any disclaimer, the term of this patent is extended or adjusted under 35 U.S.C. 154(b) by 265 days.

(21) Appl. No.: 18/367,142

(22) Filed: Sep. 12, 2023

(65) Prior Publication Data

US 2025/0085095 A1 Mar. 13, 2025

(51) Int. Cl.
*G01B 3/18* (2006.01)

(52) U.S. Cl.
CPC ............ *G01B 3/18* (2013.01); *G01B 2210/60* (2013.01)

(58) Field of Classification Search
CPC ........ G01B 3/18; G01B 2210/60; G01B 5/02; G01L 1/14; G01L 5/00
See application file for complete search history.

(56) References Cited

U.S. PATENT DOCUMENTS 4,437,241 A * 3/1984 Lemelson ............... G01W 1/00 374/E13.002
5,433,015 A * 7/1995 Mazenet .................. G01B 3/18 33/828
5,495,677 A * 3/1996 Tachikake ................ G01B 3/18 33/819
5,920,198 A * 7/1999 Suzuki ..................... G01B 3/18 340/870.37
6,260,286 B1 * 7/2001 Suzuki ..................... G01B 3/18 33/813
6,553,685 B2 * 4/2003 Nishina .................... G01B 3/18 33/813
6,915,591 B2 * 7/2005 Hayashida ............... G01B 3/18 33/815
8,739,428 B2 * 6/2014 Emtman ................ G01B 3/008 33/831
8,997,369 B2 * 4/2015 Jones ....................... G01B 3/18 33/813
10,451,450 B2 * 10/2019 Niwano ................... G01D 7/00
10,996,043 B2 * 5/2021 Tsujimoto ............. G01B 3/008
2002/0017032 A1 * 2/2002 Nishina .................... G01B 3/18 33/815
2004/0118004 A1 * 6/2004 Hayashida ............... G01B 3/18 33/815
2013/0305858 A1 * 11/2013 Jones ....................... G01B 3/18 74/89.34

(Continued)

FOREIGN PATENT DOCUMENTS

CN 106767226 A * 5/2017 ............... G01B 3/18
CN 109489515 A * 3/2019 ............... G01B 3/18

(Continued)

*Primary Examiner* — Yaritza Guadalupe-McCall
(74) *Attorney, Agent, or Firm* — David Kovacek

(57) ABSTRACT

A micrometer further comprising a pressure sensor measuring the pressure experienced by the spindle. The micrometer is configured to present an indication signal when the pressure data generated by the pressure sensor indicates that a pressure threshold has been reached. The indication signal may be presented visually or audibly. The micrometer may further comprise an automatic locking mechanism to retain the spindle in position when the pressure threshold has been reached.

20 Claims, 4 Drawing Sheets

(56) References Cited

U.S. PATENT DOCUMENTS

| | | | | |
|---|---|---|---|---|
| 2014/0007446 | A1 * | 1/2014 | Emtman | G01B 3/18<br>33/815 |
| 2018/0316120 | A1 * | 11/2018 | Hayashida | H01R 13/52 |
| 2019/0323813 | A1 * | 10/2019 | Tsujimoto | G01B 3/18 |
| 2023/0075939 | A1 * | 3/2023 | Aoki | G01B 3/18 |
| 2025/0085095 | A1 * | 3/2025 | Newkirk | G01B 3/18 |

FOREIGN PATENT DOCUMENTS

| | | | | |
|---|---|---|---|---|
| CN | 218723612 | U | * | 3/2023 |
| CN | 220093674 | U | * | 11/2023 |

* cited by examiner 100
125
119
103
143
135
141
111
311
411
137
139
401
117
101
413
113
105
115

MICROMETER WITH PRESSURE SENSOR

TECHNICAL FIELD

This disclosure relates to measurement tools.

BACKGROUND

Conventional micrometers are used to measure distances or length dimensions of objects with a very fine measure of precision. Micrometers can be accurate to ranges smaller than conventional human-scale distances, such as 1 millimeter or less. Because of this, ensuring the accuracy of measurements is highly desirable. When measuring an object, a conventional micrometer may be susceptible to overtightening, which may render the measurement inaccurate if it can induce a deformation in the object being measured. It is therefore desirable to have a micrometer that is less susceptible to causing inaccurate measurements.

SUMMARY

One aspect of this disclosure is directed to a micrometer comprising a frame having a body, a spindle, a thimble, an anvil, a displacement sensor, an indicator, and a pressure sensor. The spindle comprises a distal end and a proximal end, wherein the proximal end is at least partially disposed in the body along a first axis at a port of the body. The thimble engages the proximal end of the spindle, wherein an axial position of the spindle along the first axis changes in response to rotation of the thimble. The anvil is disposed upon the frame along the first axis and at a predetermined distance from the port. The displacement sensor generates displacement data indicating the distance between the anvil and distal end of the spindle. The indicator presents information by outputting an indication signal. The pressure sensor generates pressure data indicating pressure applied by the spindle to the thimble at the proximal end of the spindle. The indication signal is modified when the pressure data indicates that the pressure applied is greater than a threshold value. In some embodiments, the indicator comprises a display, and the indication signal comprises a visual display signal. In some embodiments, the indicator comprises a speaker, and the indication signal comprises an audible display signal. In some embodiments, the indicator comprises a light-emitting diode (LED), and the indication signal comprises an illumination signal suitable for the LED.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
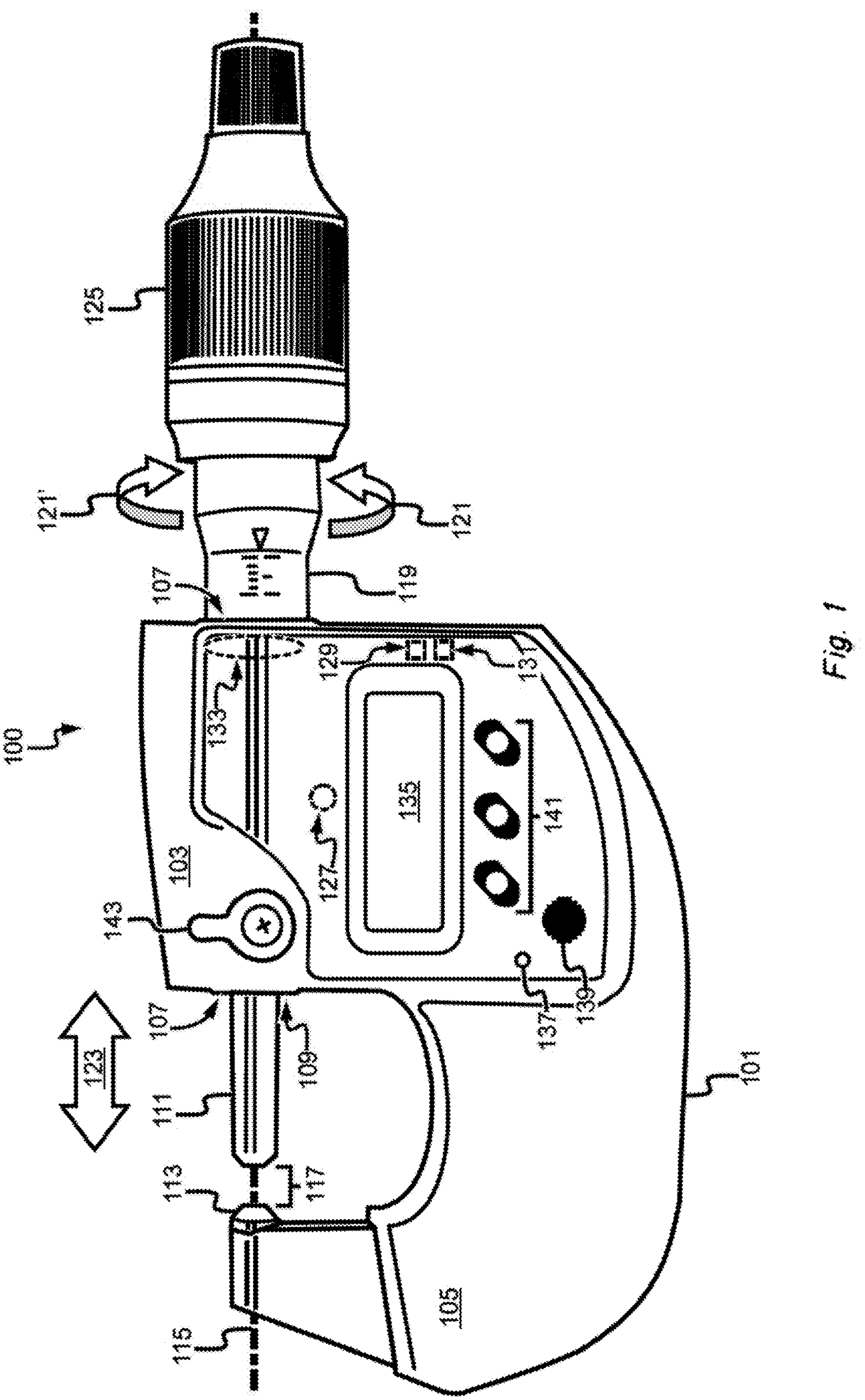
FIG. 1 is a diagrammatic view of a micrometer having a pressure sensor.

FIG. 1 is an illustration of a micrometer 100 according to one embodiment of the teachings disclosed herein. Micrometer 100 comprises a frame 101 having a body 103 and a flange 105. Body 103 comprises an interior portion suitable to house other components of micrometer 100, and also a number of ports 107 that permit access to a cavity within the body other components. In the depicted embodiment, body 103 comprises two ports 107 forming a channel 109. Other embodiments may comprise a different configuration having a different number of ports 107, or a different arrangement or shape of ports 107 without deviating from the teachings disclosed herein.

Disposed at least partially within channel 109 is a spindle 111. Positioned on flange 105 is an anvil 113 aligned axially with spindle 111 along a first axis 115. Spindle 111 is adjustably positionable along axis 115, and because the length of spindle 111 is known and the relative position of anvil 113 is known with respect to the rest of frame 101, the distance between them comprises a measurement distance 117 for the micrometer. Measurement distance 117 is a variable distance corresponding to the position of spindle 111 with respect to anvil 113 along axis 115.

Spindle 111 is further coupled to a thimble 119, which provides a user an interface for the positioning of spindle 111 along axis 115. Rotation of thimble 119 about axis 115 in rotational directions 121 and 121' cause corresponding motion of spindle 111 along axis 115 in displacement directions 123. In the depicted embodiment, thimble 119 is threaded into a port 107 to both secure the thimble 119 to frame 101, but also to enable the displacement of spindle 111. Other embodiments may comprise alternative configurations without deviating from the teachings disclosed herein. In the depicted embodiment, micrometer 100 further comprises a grip 125 to provide an ergonomic surface for a user to rotate thimble 119 as well as to provide a handle for a user during operation. In the depicted embodiment, grip 125 may also be used to apply rotational forces to thimble 119, but other embodiments may comprise other configurations without deviating from the teachings disclosed herein.

Because the relative position of anvil 113 with respect to frame 101 is known, the measuring distance 117 can be determined with precision. Disposed within body 103 is a displacement sensor 127, which generates data indicating the displacement of spindle 111 with respect to anvil 113 based upon the relative displacement of spindle 111 with respect to the extremes of the threads within body 103. This displacement data is provided to a processor 129 which is configured to interpret the displacement data and provide a human-understandable signal. In the depicted embodiment, micrometer 100 also houses within its body a memory 131 which provides operating instructions to processor 129, and in some embodiments may be utilized to store data generated during use.

Micrometer 100 also stores within body 103 a pressure sensor 133, which measures the pressure exerted upon thimble 119 by spindle 111 and generates pressure data indicating the measurement. In measuring the pressure applied by spindle 111 onto thimble 119, pressure sensor 133 effectively measures the pressure exerted onto the distal end of spindle 111 when it comes into contact with an object, such as anvil 113 or an object or workpiece subjected to dimensional measurement. When the pressure data indicates a pressure level that reaches or surpasses a predetermined threshold, processor 129 generates an indicator signal that can be presented to a user via a presentation element of micrometer 100. The indicator signal may be used to inform a user that the pressure threshold has been reached, and in the depicted embodiment this may be presented as indicating that the measurement operation has found its accurate reading. Advantageously, the pressure threshold can be set to accommodate a workpiece of an expected material type, and when contact is made between the workpiece and the spindle 111, the pressure between the two indicates that the measurement distance 117 is accurate to the dimension of the workpiece under measurement.

In the depicted embodiment, micrometer 100 comprises a number of presentation elements including a display 135, a light-emitting diode (LED) indicator 137, and a speaker 139. Other embodiments may comprise only some of display 135, LED indicator 137, or speaker 139 without deviating from the teachings disclosed herein. Some embodiments may comprise different or additional presentation elements to present indicator signals to a user without deviating from the teachings disclosed herein.

During normal operation, display 135 may be utilized to present a human-readable signal displaying the value of measurement distance 117 in a user-selected notation of units and scale (e.g., distance measured in millimeters). However, once the pressure has reached the threshold value, display 135 may be used to display an indication signal that the pressure threshold has been reached. The indication signal may be displayed in lieu of the measurement value, or may be displayed in tandem or alternation with the measurement signal without deviating from the teachings disclosed herein. In some such embodiments, a user may choose the desired display behavior, and the user selections may be stored in memory 131 for reference by processor 129 during measurement.

In the depicted embodiment, once the pressure threshold has been reached, LED indicator 137 may illuminate to indicate that status. In the depicted embodiment, LED indicator 137 may present different signals indicating different status. By way of example, and not limitation, the illumination of LED indicator 137 may comprise a blinking signal, a steady-state illumination, a pulse waveform illumination, or illumination using a plurality of different colors to indicate different statuses without deviating from the teachings disclosed herein. In the depicted embodiment, the LED indicator 137 may be configured to remain unilluminated until the pressure threshold has been reached, and then may continuously blink in a single color. In other embodiments, the LED indicator 137 may illuminate with different colors to indicate different pressures measured by pressure sensor 133. By way of example, and not limitation, the LED indicator 137 may illuminate in green for zero or minimal pressure measurements, amber for pressure measurements not within a specified range of the pressure threshold, and red for pressure measurements at the pressure threshold or beyond. Other embodiments may make use of any combination of illumination patterns and colors of an LED indicator 137 without deviating from the teachings disclosed herein. In some embodiments, a user may choose the desired LED behavior, and the user selections may be stored in memory 131 for reference by processor 129 during measurement.

In the depicted embodiment, once the pressure threshold has been reached, speaker 139 may present an audible indication signal to indicate that status. In the depicted embodiment, speaker 139 may present different signal types indicating different status, or to accommodate a user preference. By way of example, and not limitation, speaker 139 may emit an audible indication signal comprising a sinusoidal tone, a square wave tone, a triangle wave tone, a sawtooth tone, a noise tone, a burst of audible signal such as a beep or chirp, a klaxon signal, or any other audible indication signal recognized by one of ordinary skill in the art without deviating from the teachings disclosed herein. In some embodiments, the characteristics of the tone may vary to indicate different pressures measured by pressure sensor 133. By way of example, and not limitation, a tone may be emitted of a specified sinusoidal frequency at different volume levels to correspond to different pressure measurements, with the speaker remaining silent for zero or minimal pressure measurements, a "quiet" volume used for pressure measurements within a specified range of the pressure threshold, and a "loud" volume used for pressure measurements at or beyond the pressure threshold. Other embodiments may make use of any combination of audible signal patterns, frequencies, and volumes of a speaker 139 recognized by one of ordinary skill without deviating from the teachings disclosed herein. In some embodiments, a user may choose the desired speaker behavior, and the user selections may be stored in memory 131 for reference by processor 129 during measurement.

Micrometer further comprises a number of user-oriented elements to enhance its utility during a measurement operation. In the depicted embodiment, this comprises a human-machine interface (HMI) 141 suitable to provide a user with inputs to the processor 129 and control aspects of operation. In the depicted embodiment, HMI 141 comprises a plurality of buttons, but other embodiments may comprise other inputs without deviating from the teachings disclosed herein. By way of example, and not limitation, other such embodiments may comprise switches, softkeys, a touchscreen input, buttons, or any combination thereof without deviating from the teachings disclosed herein.

HMI 141 provides a user with the ability to select user preferences for the presentation elements, calibrate the displacement sensor 127 and pressure sensor 133, or store or recall measurement data in memory 131. HMI 141 may additionally be utilized to change the units or scale of display. In some embodiments, HMI 141 and display 135 may be utilized to permit a user to change the pressure threshold for use during a measurement operation.

Processor 129 is in data communication with each of the other electric elements of micrometer 100. In depicted embodiments, processor 129 is in data communication via data connection (not shown) with each of displacement sensor 127, memory 131, pressure sensor 133, display 135, LED indicator 137, speaker 139, and HMI 141. Other embodiments featuring a different configuration or arrangement of elements may comprise different, fewer, or additional data connections without deviating from the teachings disclosed herein. In the depicted embodiment, all of the electric elements of micrometer 100 are powered via portable power supply stored within body 103, such as a battery (not shown). Other embodiments may comprise an electrical connection to an external power supply instead of, or in addition to, a portable power supply without deviating from the teachings disclosed herein.

Micrometer 100 additionally comprises a lock 143. Lock 143 is suitable to prevent motion of spindle 111 along axis 115 in directions 123. Lock 143 may comprise a clutch, a cinch, a stopper, a retaining pin, or any other retention mechanism known to one of ordinary skill without deviating from the teachings disclosed herein. In the depicted embodiment, lock 143 engages via a rotational motion moving the relative orientation of the lock 143 from an unlocked position to a locked position. Lock 143 may be disengaged by reversing the rotation back to the unlocked position. In the depicted embodiment, lock 143 comprises an automatic lock 143 in data communication with processor 129 via a data connection (not shown). In such an embodiment, processor 129 may engage lock 143 automatically in response to the pressure sensor 133 indicating that the pressure threshold has been reached. Automatic locking function may be achieved using a solenoid, electric actuator, electric lever arm, or any other activation mechanism for a retention mechanism known to one of ordinary skill in the art without deviating from the teachings disclosed herein. In the depicted embodiment, lock 143 requires a manual disengagement, but other embodiments may comprise automatic or electronically-controlled disengagement mechanisms without deviating from the teachings disclosed herein.

Figure 2:
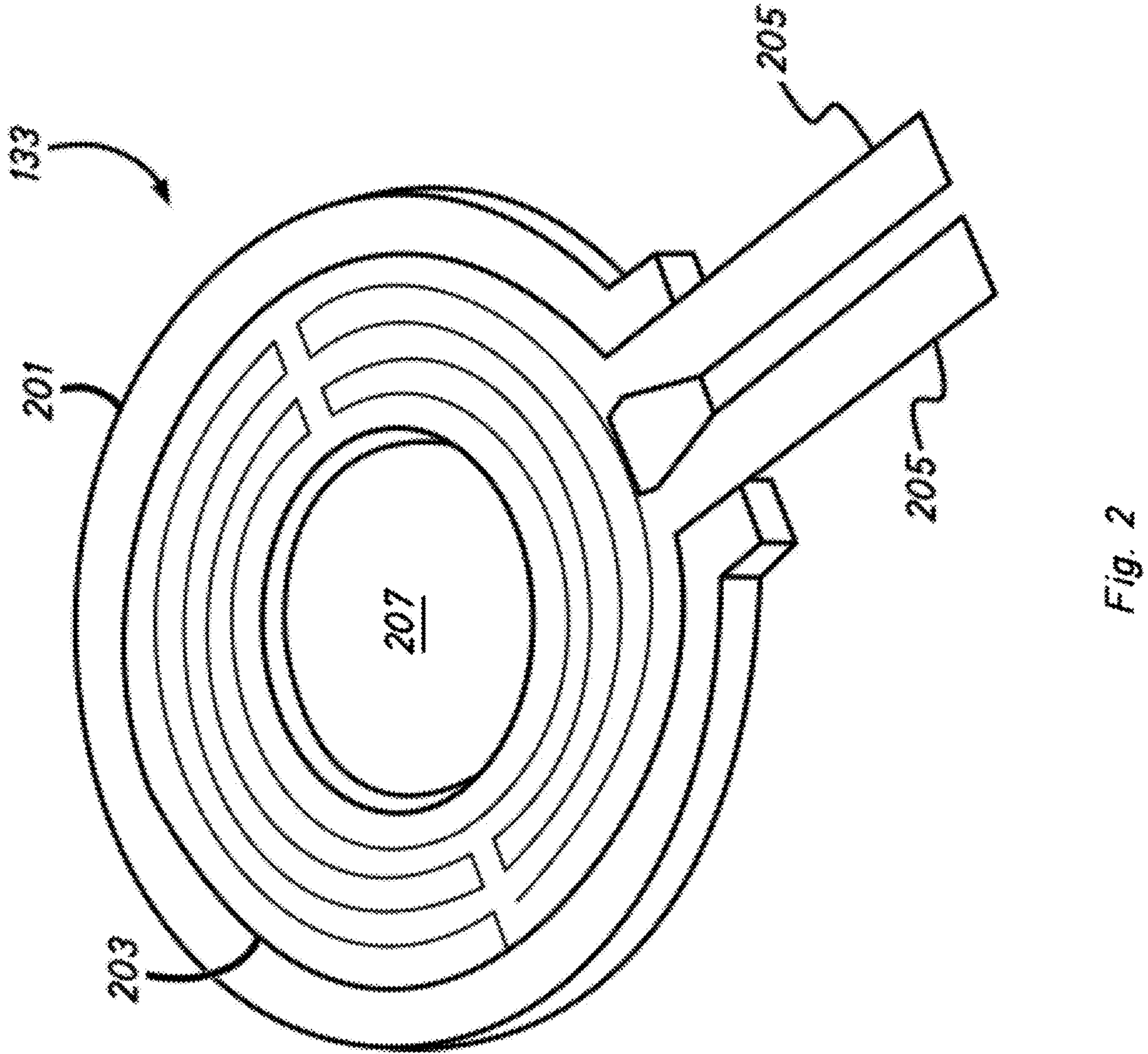
FIG. 2 is a diagrammatic illustration of a pressure sensor for use within a micrometer.

FIG. 2 is an illustration of a pressure sensor 133 suitable for use in a micrometer (such as micrometer 100; see FIG. 1). Pressure sensor 133 comprises a housing 201 providing structural support for a capacitive matrix 203 connected at either end to one of a number of electrical leads 205. Capacitive matrix 203 holds a charge, and the close proximity of the turns of capacitive matrix 203 conductive elements generates a capacitive effect between leads 205. By displacing the turns of the capacitive matrix with respect to the other turns, the capacitive effect is modified, changing the charge experienced between the leads 205. This change in charge creates a pressure measurement signal, and a properly calibrated processor can interpret the pressure measurement signal in response to physical displacement of the turns of the capacitive matrix 203. In the depicted embodiment, the center of the capacitive matrix 203 may be displaced directly by contact between a spindle (such as spindle 111; see FIG. 1) and an additional surface (such as the surface of a thimble to which a spindle is couple, such as thimble 119; see FIG. 1). As the pressure between the spindle and the additional surface increases, the pressure sensor 133 generates a greater signal because the capacitive matrix 203 expands to increase the capacitive effect.

In the depicted embodiment, frame 201 additionally comprises a gap 207 suitable to permit pressure sensor 133 to be mounted or threaded by other physical components (such as spindle 111; see FIG. 1). Other embodiments may comprise other mounting configurations without deviating from the teachings disclosed herein.

In the depicted embodiment, the pressure sensor 133 may comprise an operational scale suitable to be used with workpieces of corresponding scale. By way of example, and not limitation, a larger workpiece may subject a greater pressure upon a measurement spindle, and thus a less sensitive pressure sensor would be needed or desired in a corresponding micrometer. In some embodiments, pressure sensor 133 has a measurable pressure range on the order 5 ounces of pressure, and generates a pressure signals that are accurate to within a half-ounce of pressure. By way of example, and not limitation, micrometer 100 (see FIG. 1) may have a pressure threshold set to approximately 1 ounce of pressure, with an accuracy range of ±0.5 ounces of pressure. In some embodiments, the micrometer may have a pressure threshold that is chosen by the user without deviating from the teachings disclosed herein.

Figure 3:
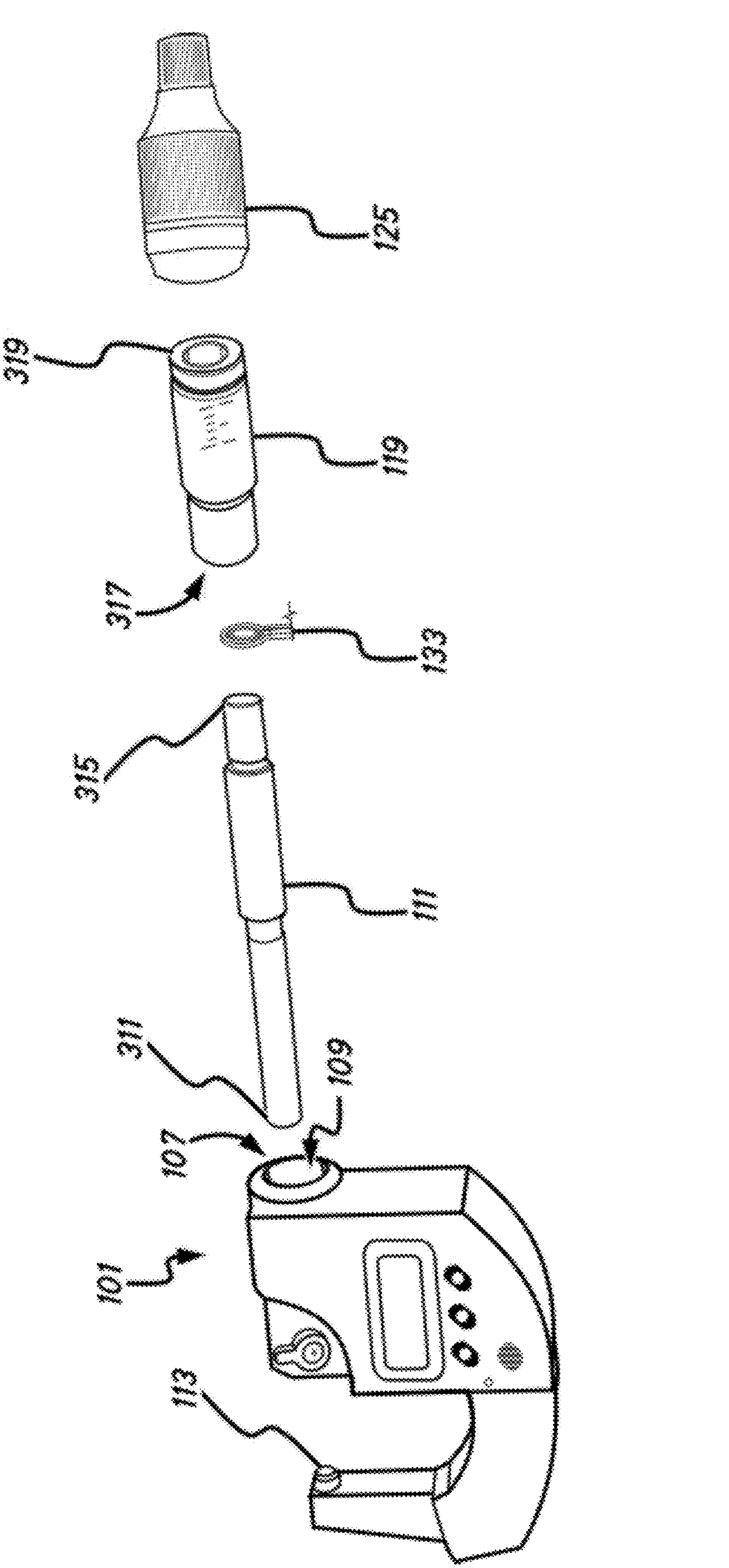
FIG. 3 is an exploded diagrammatic illustration of portions of a micrometer having a pressure sensor.

FIG. 3 is an exploded diagrammatic view of micrometer 100, illustrating additional components or facets thereof. In the depicted embodiment, spindle 111 comprises a distal end 311 and a proximal end 315 disposed opposite from each other along the longest axis of spindle 111. Distal end 311 provides the measurement reference point between spindle 111 and anvil 113 which defines measurement distance 117 (not shown; see FIG. 1) during measurement operations. Spindle 111 is coupled to thimble 119 at the proximal end 315 to enable control of the axial displacement of spindle 111 during measurement operation. In the depicted embodiment, pressure sensor 133 is disposed between the proximal end 315 and a first coupling surface 317 of thimble 119, but other embodiments may comprise other arrangements of pressure sensor 133 without deviating from the teachings disclosed herein. By way of example, and not limitation, some embodiments comprise an alternative placement or additional placement of a pressure sensor 133 between a second coupling surface 319 of thimble 119 and a third coupling surface 325 of grip 325, which defines the coupling boundary between thimble 119 and grip 325 when micrometer 100 is fully assembled. Other embodiments may comprise different arrangements or configurations without deviating from the teachings disclosed herein.

Figure 4:
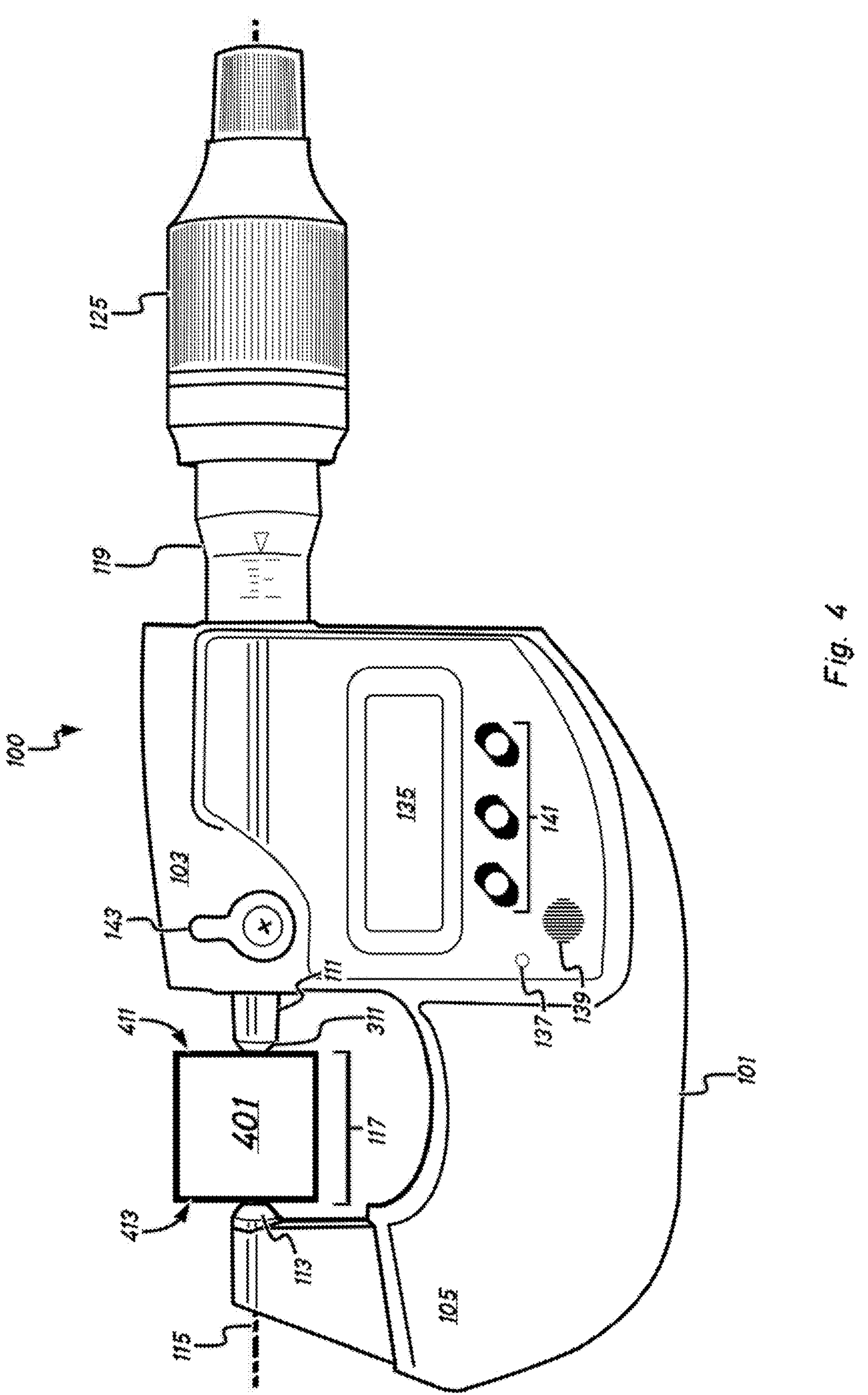
FIG. 4 is a diagrammatic view of a micrometer having a pressure sensor during utilization with a workpiece.

FIG. 4 is an illustration of micrometer 100 in use to determine the measurement distance 117 corresponding to a dimension of a workpiece 400. In this arrangement, spindle 111 is displaced into body 103 and displaced out of body 103 toward anvil 113 along axis 115. When the spindle 111 has extended to a sufficient displacement, a proximal surface 411 of workpiece 401 makes contact with spindle 111 while a distal surface 413 makes contact with anvil 113. This contact exerts pressure onto spindle 111 because of Newton's Third Law of Motion, which is measured by a pressure sensor inside body 103 (such as pressor sensor 133; see FIG. 1, FIG. 2, FIG. 3). The pressure sensor generates pressure data indicating the pressure measurement experienced by spindle 111. When the pressure data indicates that the pressure has reached a predetermined threshold value, an indication signal is presented to a user via display 135, LED indicator 137, and/or speaker 139. In the depicted embodiment, lock 143 comprises an automatic lock, and upon the pressure data indicating the pressure threshold has been reached, lock 143 automatically engages to prevent spindle 111 from extending any further toward anvil 113. Advantageously, automatic engagement of lock 143 retains spindle 111 in the proper measurement position, and additionally prevents additional extension of spindle 111 which may cause damage or deformation to workpiece 401.

The pressure threshold may be adjusted to accommodate for different workpieces. By way of example, and not limitation, workpieces comprised of a malleable, supple, flexible, or soft material (such as a polymer, elastomer, textile, organic materials like leather, or a composite selected for its flexibility) may exhibit less rigidity than other materials with stiffer and more rigid properties (such as a metal, semiconductor, ceramic, or composite material selected for rigidity). In such scenarios, a smaller amount of pressure experienced by the workpiece 401 can damage one or more surfaces thereof. Alternatively, a workpiece 401 exhibit supple or flexible characteristics can deform under pressure, leading to an imprecise measurement. Utilizing the pressure sensor with a threshold set appropriately for the size and composition of a workpiece 401 can thus advantageously provide a more accurate measurement of the dimensions of the workpiece and reduce risk of damage to the workpiece during measurement. Conversely, larger workpieces or workpieces comprising sturdier materials can be measured utilizing a higher pressure threshold, to ensure an accurate measurement acquired via secure contact between surfaces of the workpiece 401 and each of spindle 111 and anvil 113.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A micrometer comprising:
a frame having a body;
a spindle having a distal end and a proximal end, the proximal end at least partially disposed in the body along a first axis at a port of the body;
a thimble engaging the proximal end of the spindle, wherein an axial position of the spindle along the first axis changes in response to rotation of the thimble;
an anvil disposed upon the frame along the first axis and at a predetermined distance from the port;
a displacement sensor generating displacement data indicating the distance between the anvil and distal end of the spindle;
an indicator configured to present information; and
a pressure sensor generating pressure data indicating pressure applied by the spindle to the thimble at the proximal end of the spindle,
wherein
the pressure sensor is at least partially disposed between the spindle and the thimble, and
the indicator outputs an indication signal when the pressure data indicates that the pressure is greater than a threshold value.

2. The micrometer of claim 1, wherein the threshold value is 1 ounce of pressure.

3. The micrometer of claim 2, wherein the pressure sensor is accurate to within one half-ounce.

4. The micrometer of claim 1, further comprising a lock configured to hold the spindle in its current position when the lock is engaged.

5. The micrometer of claim 4, wherein the lock is an automatic lock that is configured to engage in response to the pressure data indicating that the pressure is greater than the threshold value.

6. The micrometer of claim 1, wherein the indicator comprises a display and a speaker, the indication signal comprises a visual output and an audible output, the display is configured to present a visual output indicating when the pressure is greater than the threshold value, and the speaker configured to present an audible output indicating when the pressure is greater than the threshold value.

7. The micrometer of claim 1, wherein the indicator comprises a light-emitting diode (LED) that illuminates when the pressure is greater than the threshold value.

8. A micrometer comprising:
a frame having a body;
a spindle having a thread, a distal end and a proximal end, the proximal end at least partially disposed in the body along a first axis at a port of the body;
a thimble engaging the proximal end of the spindle, wherein an axial position of the spindle along the first axis changes in response to rotation of the thimble;
an anvil disposed upon the frame along the first axis and at a predetermined distance from the port;
a displacement sensor generating displacement data indicating the distance between the anvil and distal end of the spindle;
an indicator configured to present information; and
a pressure sensor generating pressure data indicating pressure applied by the spindle to the thimble at the proximal end of the spindle,
wherein
the pressure sensor is at least partially disposed between the spindle and the thimble,
the indicator outputs an indication signal when the pressure data indicates that the pressure is greater than a threshold value, and
the indication signal comprises a visual output.

9. The micrometer of claim 8, wherein the threshold value is 1 ounce of pressure.

10. The micrometer of claim 9, wherein the pressure sensor is accurate to within one half-ounce.

11. The micrometer of claim 8, further comprising a lock configured to hold the spindle in its current position when the lock is engaged.

12. The micrometer of claim 11, wherein the lock is an automatic lock that is configured to engage in response to the pressure data indicating that the pressure is greater than the threshold value.

13. The micrometer of claim 8, wherein the indicator further comprises a speaker, the speaker configured to present an audible output indicating when the pressure is greater than the threshold value.

14. A micrometer comprising:
a frame having a body;
a spindle having a thread, a distal end and a proximal end, the proximal end at least partially disposed in the body along a first axis at a port of the body;
a thimble engaging the proximal end of the spindle, wherein an axial position of the spindle along the first axis changes in response to rotation of the thimble;
an anvil disposed upon the frame along the first axis and at a predetermined distance from the port;
a displacement sensor generating displacement data indicating the distance between the anvil and distal end of the spindle;
an indicator configured to present information; and
a pressure sensor generating pressure data indicating pressure applied by the spindle to the thimble at the proximal end of the spindle,
wherein
the pressure sensor is at least partially disposed between the spindle and the thimble,
the indicator outputs an indication signal when the pressure data indicates that the pressure is greater than a threshold value, and
the indication signal comprises an audible output.

15. The micrometer of claim 14, wherein the threshold value is 1 ounce of pressure.

16. The micrometer of claim 15, wherein the pressure sensor is accurate to within one half-ounce.

17. The micrometer of claim 14, further comprising a lock configured to hold the spindle in its current position when the lock is engaged.

18. The micrometer of claim 17, wherein the lock is an automatic lock that is configured to engage in response to the pressure sensor generating data indicating that the pressure is greater than a threshold value.

19. The micrometer of claim 14, wherein the indicator further comprises a display, the display configured to present a visual output indicating when the pressure has surpassed the threshold value.

20. The micrometer of claim 14, wherein the indicator comprises a light-emitting diode (LED) that illuminates when the pressure is greater than the threshold value.

* * * * *